S. W. MURRAY & B. P. LAMASON.

King-Bolts for Railway Car-Trucks.

No. 5,546. Reissued August 19, 1873.

Witnesses.
H. L. Pruin
A. H. Norris.

Inventors.
S. W. Murray and
Per. B. P. Lamason
James L. Norris.
Atty.

THE NORRIS PETERS CO., PHOTO-LITHO., WASHINGTON, D. C.

UNITED STATES PATENT OFFICE.

SAMUEL W. MURRAY AND BENJAMIN P. LAMASON, OF MILTON, PA.

IMPROVEMENT IN KING-BOLTS FOR RAILWAY-CAR TRUCKS.

Specification forming part of Letters Patent No. 114,028, dated April 25, 1871; reissue No. 5,546, dated August 19, 1873; application filed June 16, 1873.

*To all whom it may concern:*

Be it known that we, SAMUEL W. MURRAY and BENJAMIN P. LAMASON, of Milton, in the county of Northumberland and State of Pennsylvania, have invented a certain new and useful Improvement in King-Bolts for Railway-Car Trucks, of which the following is a specification:

It is the object of our invention to connect the body of a car with the truck in such a manner that if from any accident the king-bolt is injured the body of the car can be raised from the truck without removing or disturbing said king-bolt. Our invention consists of a king-bolt for connecting or uniting together the bolster of a car-body with the bolster of a truck, said king-bolt being wrought from a bar or rod of metal without a collar or a head, and supported by or have its bearing at its lower end upon a seat secured beneath the truck-bolster, and thus prevented from being lost by dropping from its seat, the prime office of such constructed bolt being that the car-body with its bolster can be raised from or elevated above the truck without disturbing or removing the bolt; or, if the bolt should from any cause "hang" within its seat in the car-body bolster, said bolt can be withdrawn from the truck-bolster by the raising of the car-body and bolster. By such means all perforations of the car-body for the passage of the bolt is avoided and the ready removal of the trucks accomplished. The invention further consists of a combination of parts, as will be hereinafter specified.

Figure 1:
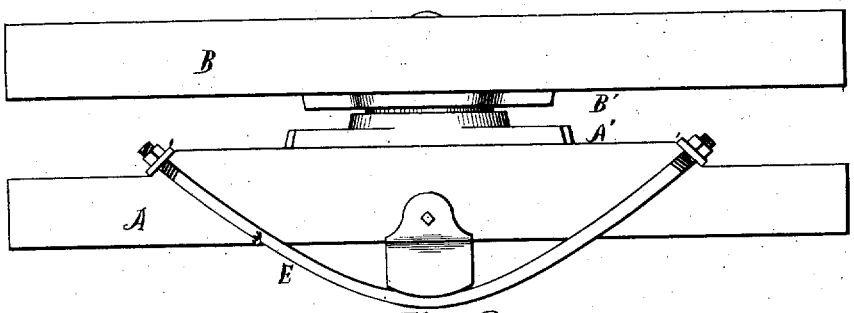
Figure 2:
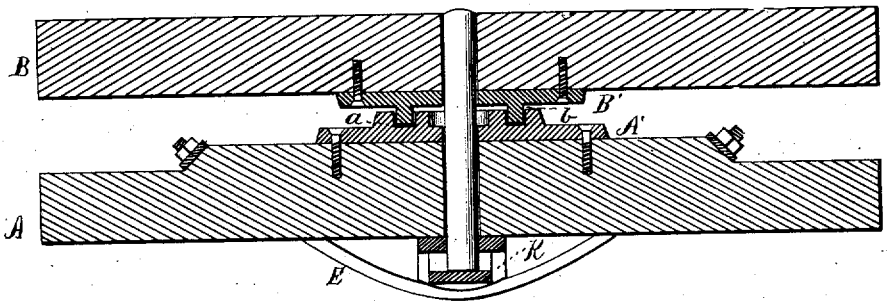
Figure 3:
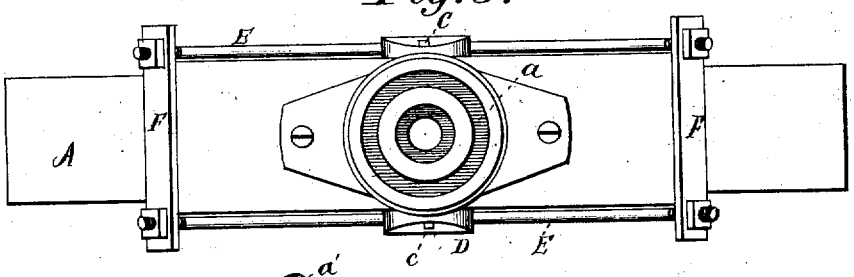
Figure 4:
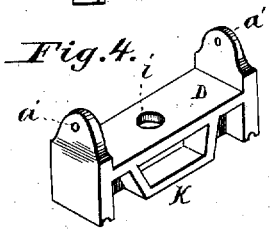
Figure 5:
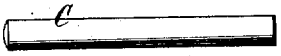

In the drawings, Figure 1 is a front elevation of a truck-bolster of a car-body, illustrating our several improvements attached thereto. Fig. 2 is a central longitudinal section of the same. Fig. 3 is a top or plan view of a truck-bolster, illustrating the truss rods and braces. Fig. 4 is a perspective view of a stirrup and truss-rod saddle adapted to support the king-bolt. Fig. 5 is a side view of our improved king-bolt for connecting the truck and car bolsters, said bolt being formed without a head or collar.

In the several figures like letters of reference indicate corresponding parts.

The letter A designates the top or bearing bolster of a railroad-car truck, while the bearing-bolster of the car-body is designated by the letter B, and both of which are of the ordinary or usual construction. Each of these bolsters is provided with bearing-plates A′ B′, the former having a recess, *a*, to receive a depending lug or projection, *b*, these parts being preferably thus constructed to prevent a lateral movement of the bolsters, so that the strain upon the king-bolt is materially diminished. In order to connect the bolster of the car-body and of the truck, so that the car-body can be elevated for the purpose of removing the truck or trucks with facility, we employ a king-bolt, C, formed from a bar or rod of metal, without a head or collar, for supporting the same, said bolt passing loosely into the openings of the bolsters A B. This bolt is of a length sufficient to extend entirely through, or nearly so, both bolster and the bearing-plates A′ B′, if such be used, and is supported at its lower end by or upon a bearing connected with the truck-bolster in such a manner as to be safely retained in its seat, or, in other words, prevented from being lost by dropping through the opening in the bolster of the truck. By the employment of this form of bolt, and supporting it at its lower end by suitable bearings on the truck-bolster, we are enabled to connect the car-body with its trucks without perforating the floor of the car; and, further, the car-body with its bolster can be elevated and the trucks removed without removing the king-bolt; or, if said king-bolt from any cause should hang in its seat in the car-body bolster, it, together with said bolster, can be elevated and the bolt be withdrawn from the truck. D is a combined stirrup and truss-rod saddle, made of metal, and fastened to the truck-bolster A by means of bolts *c* passing through the holes *a′ a′* in the upper projection of the saddle, the truss-rods E passing down under the lower projections of the saddle, which may be grooved to receive and hold them in position, while their ends are raised to the upper portions of the bolster and pass through holes in the projecting ends of the plates F. These plates rest against shoulders formed on bolster A, so inclined as to admit at right angles to their surfaces the ends of the truss-rods E. The ends of the latter are provided with screws and nuts, which, when rigidly screwed up, form a permanent and substantial structure. The stirrup and truss-rod saddle furnishes a good base to support the king-bolt C when in place, the king-bolt passing through the bolster A, down through the opening *i* in the saddle, and resting on the stirrup K formed on the same.

Having thus fully described our invention, what we claim as new, and desire to secure by reissue Letters Patent, is–

1. The king-bolt C, formed without a collar or head and supported at its lower end upon a seat secured beneath the truck-bolster, for connecting together the bolsters of the car-body and the truck, substantially as described, for the purpose specified.

2. The truck and body bolster A B, having bearing-plates A′ B′, in combination with the headless king-bolt C, supported upon a bearing secured beneath the bolster A, substantially as described.

3. The bolster A, having a supporting-bearing, D, in combination with the headless king-bolt C and car-body bolster B, substantially as described.

4. The saddle D, forming a truss-bridge for the braces E, and having a central opening, *i*, for the passage of the king-bolt, and constructed with a stirrup, K, for the latter to rest upon, substantially as shown and described, and for the purpose set forth.

In testimony that we claim the foregoing we have hereunto set our hands this 29th day of May, A. D. 1873.

SAMUEL W. MURRAY.
BENJ. P. LAMASON.

Witnesses:
C. C. McCormick,
R. M. Longmore.